US010657707B1

(12) United States Patent
Leise

(10) Patent No.: US 10,657,707 B1
(45) Date of Patent: May 19, 2020

(54) PHOTO DEFORMATION TECHNIQUES FOR VEHICLE REPAIR ANALYSIS

(71) Applicant: STATE FARM MUTUAL AUTOMOBILE INSURANCE COMPANY, Bloomington, IL (US)

(72) Inventor: William J. Leise, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 214 days.

(21) Appl. No.: 15/865,442

(22) Filed: Jan. 9, 2018

Related U.S. Application Data

(60) Provisional application No. 62/444,110, filed on Jan. 9, 2017.

(51) Int. Cl.
| | |
|---|---|
| *G06T 17/00* | (2006.01) |
| *G06T 7/593* | (2017.01) |
| *H04N 5/232* | (2006.01) |
| *G06Q 10/00* | (2012.01) |
| *G06N 20/00* | (2019.01) |
| *G06Q 40/08* | (2012.01) |

(52) U.S. Cl.
CPC ............. *G06T 17/00* (2013.01); *G06N 20/00* (2019.01); *G06Q 10/20* (2013.01); *G06T 7/593* (2017.01); *H04N 5/23222* (2013.01); *G06Q 40/08* (2013.01); *G06T 2207/10012* (2013.01); *G06T 2207/10024* (2013.01); *G06T 2207/10028* (2013.01); *G06T 2207/20081* (2013.01); *G06T 2207/30252* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 8,972,100 | B2 | 3/2015 | Mullen et al. |
| 8,977,425 | B1 | 3/2015 | Mullen et al. |

(Continued)

FOREIGN PATENT DOCUMENTS

| | | | | | |
|---|---|---|---|---|---|
| GB | 2554361 A | * | 4/2018 | ............. | G06Q 10/10 |
| WO | WO-2017055878 A1 | * | 4/2017 | ........... | G06K 9/6263 |

OTHER PUBLICATIONS

Wang, J., Yang, Y., Mao, J., Huang, Z., Huang, C., & Xu, W. (2016). CNN-RNN: A unified framework for multi-label image classification. arXiv 1604.04573 (Year: 2016).*

(Continued)

*Primary Examiner* — Jiangeng Sun
(74) *Attorney, Agent, or Firm* — Marshall, Gerstein & Borun LLP

(57) ABSTRACT

A method and system may use photo deformation techniques for vehicle repair analysis to determine a repair time for repairing a damaged vehicle part. A user's client device may generate a three-dimensional (3D) image or model of a damaged vehicle part by capturing several two-dimensional images of the damaged vehicle part. One or several characteristics of the damaged vehicle part may be extracted from the 3D model and the characteristics may be compared to characteristics for previously damaged vehicle part, where the actual repair times were measured. A repair time for the damaged vehicle part may be determined based on the comparison and displayed on the client device.

20 Claims, 10 Drawing Sheets

(56) References Cited

U.S. PATENT DOCUMENTS

| | | |
|---|---|---|
| 9,208,526 B1 | 12/2015 | Leise |
| 9,361,735 B1 | 6/2016 | Leise |
| 9,466,085 B2 | 10/2016 | Mullen et al. |
| 9,495,667 B1 | 11/2016 | Leise |
| 9,607,339 B1 | 3/2017 | Mullen et al. |
| 9,646,345 B1 | 5/2017 | Leise |
| 9,799,010 B1 | 10/2017 | Leise |
| 9,898,784 B1 | 2/2018 | Leise |
| 9,904,928 B1 | 2/2018 | Leise |
| 10,360,635 B2* | 7/2019 | Hanson ................. G06Q 40/08 |
| 2011/0276396 A1* | 11/2011 | Rathod ................. G06Q 10/00 705/14.49 |

OTHER PUBLICATIONS

Kira, "The Best 3D Scanners of 2015", retrieved from <url:http://www.3ders.org/articles/20151209-best-3d-scanners-2015.html> (Year: 2015).*
U.S. Appl. No. 14/627,170, filed Feb. 20, 2015.
U.S. Appl. No. 14/732,326, filed Jun. 5, 2015.

* cited by examiner

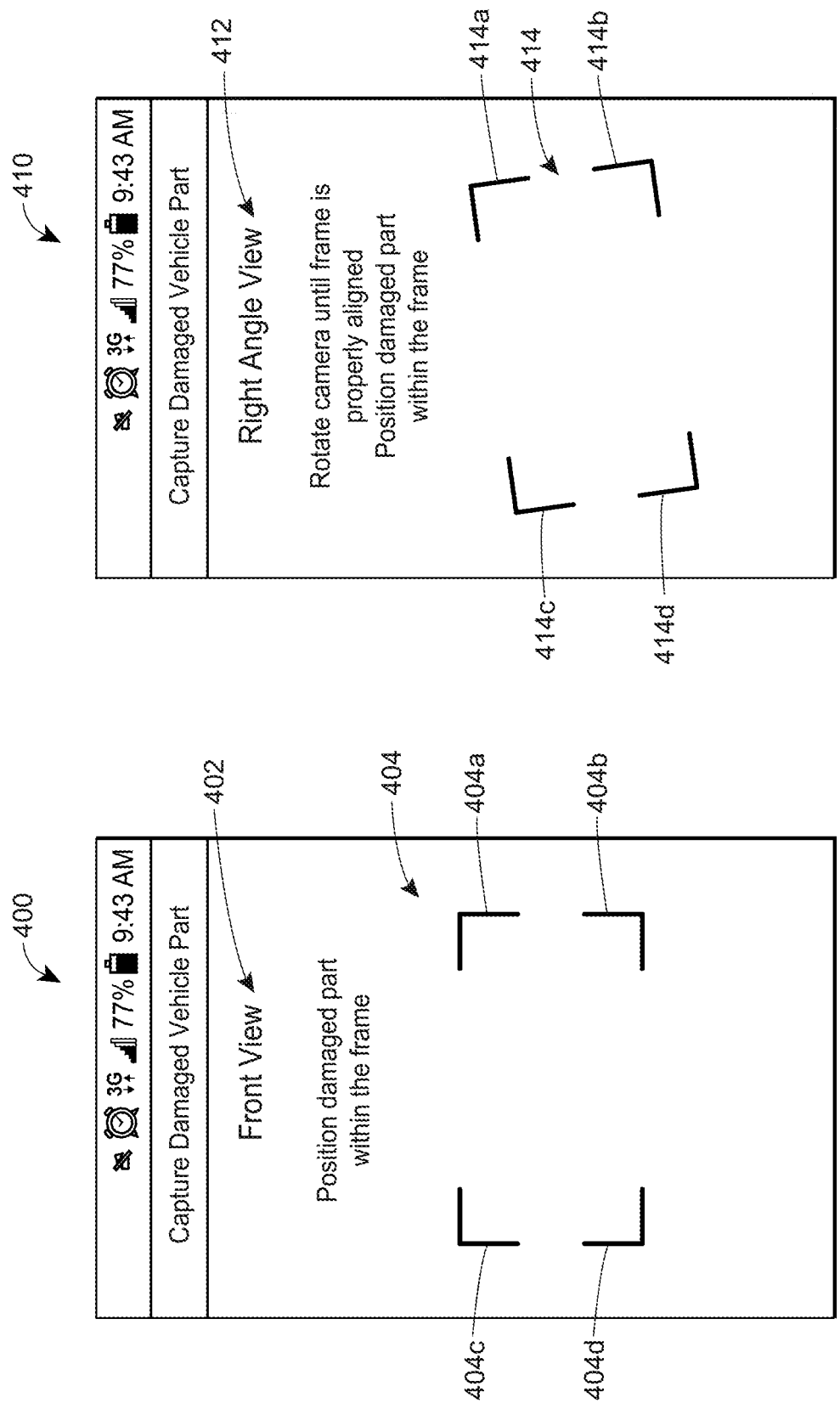

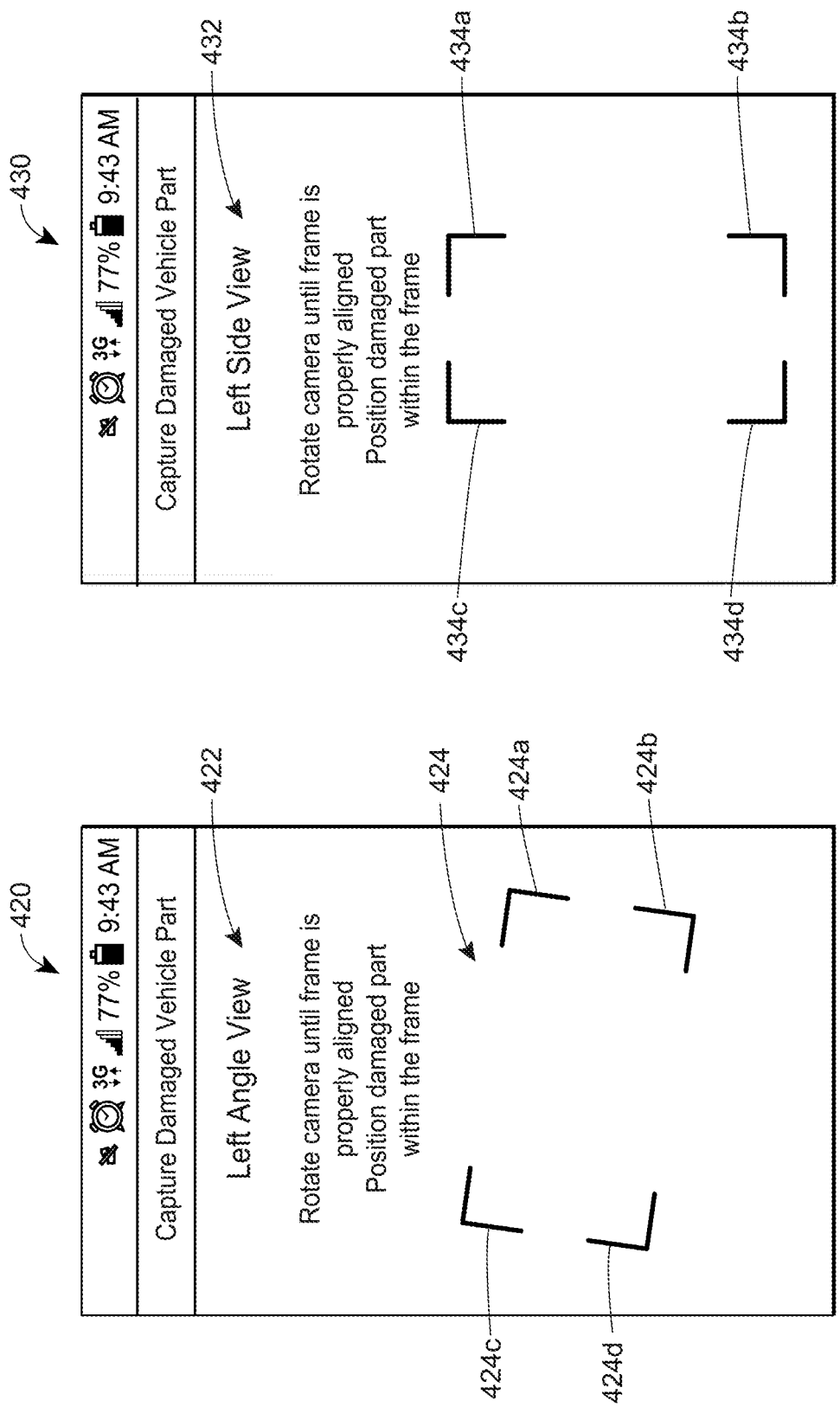

PHOTO DEFORMATION TECHNIQUES FOR VEHICLE REPAIR ANALYSIS

CROSS-REFERENCE TO RELATED APPLICATIONS

This application claims priority to and the benefit of the filing date of provisional U.S. Patent Application No. 62/444,110 entitled "Photo Deformation Techniques for Vehicle Repair Analysis," filed on Jan. 9, 2017, the entire contents of which is hereby expressly incorporated herein by reference.

TECHNICAL FIELD

The present disclosure generally relates to identifying vehicle repair times and, more particularly to utilizing photo deformation techniques to create a model of a damaged vehicle part and machine learning techniques to determine actual and estimated repair times for the damaged vehicle part.

BACKGROUND

The amount of time estimated to repair a damaged vehicle part may vary substantially from estimate to estimate so that the estimated repair time from a repair service provider or appraiser is significantly different. The amount of time estimated to repair a damaged vehicle part may also vary substantially from the actual time it takes for a qualified technician to repair a damaged vehicle part. Moreover, the variation on estimated repair times may be much wider than the variation on actual repair times for a particular vehicle part. For example, the estimated repair times for a side door may range from 5 to 14 hours, whereas the actual repair times may only range from 0.5 to 3.5 hours for the side door. In this example, the spread of the estimated repair times is triple the spread for the actual repair times.

The difference in the amount of variation between the estimated and actual repair times highlights the challenges of manually estimating the amount of time it takes for repairing damaged vehicle parts. Such a wide variation creates an inefficient system where vehicle owners shop around at several vehicle repair facilities to find significantly lower estimates. Moreover, because insurance providers typically pay according to the estimate, the added variation may cause the insurance providers to overpay for vehicle repairs.

SUMMARY

To efficiently and accurately determine a repair time for a damaged vehicle part, a repair time system may be trained using various machine learning techniques to create a predictive model for determining the repair time based on damaged part characteristics. The repair time system may be trained by obtaining repair data for previously damaged vehicle parts. For example, the repair data may include the type of vehicle part (e.g., the hood, the trunk, a side door, a fender, etc.), identification information for the vehicle (e.g., a Vehicle Identification Number (VIN), a make and model of the vehicle, etc.), damaged part characteristics for the vehicle part (e.g., a dent circumference of a dent to the damaged vehicle part, a dent radius, a depth of the dent, a shape of the dent, a part base material, etc.), and the actual repair time for repairing the vehicle part. The training data may be analyzed using the various machine learning techniques to generate a predictive model which may be used to determine an actual repair time for a subsequently damaged vehicle part. Machine learning techniques may also be used to determine a repair vs. replacement decision when a vehicle part is damaged.

After the training period, a user may capture one or several images or video of a damaged vehicle part via a client device to generate a three-dimensional (3D) image (also referred to herein as a "3D model") of the damaged vehicle part. In some embodiments, a laser scanning device may be removably attached to the client device to identify depth within the images. In other embodiments, the user may capture images or video of the damaged vehicle part at several positions and/or angles and the images may be stitched together using photogrammetric techniques to generate the 3D model.

In any event, the repair time system may analyze the 3D model of the damaged vehicle part to identify damaged part characteristics. The damaged part characteristics along with the identification information for the vehicle may be compared to the "learned" predictive model to determine a repair time for repairing the damaged vehicle part. In some embodiments, the repair time system may determine a confidence interval for the repair time (e.g., from three to four hours with 95 percent confidence). The determined repair time and/or confidence interval may then be displayed on the user's client device.

In this manner, the variation in repair estimates after a vehicle crash is greatly reduced. Moreover, by comparing damaged part characteristics for a damaged vehicle part to a predictive model created using training data, the present embodiments advantageously increase the accuracy of determining repair times immediately after a vehicle crash. While previous systems provided repair time estimates with a large amount of variation which greatly differed from the actual repair times, the present embodiments increase the accuracy of determining repair times by using previously damaged vehicle part data to train the repair time system. Still further, by creating a 3D model of a damaged vehicle part, the present embodiments determine repair times with increased accuracy over previous systems which merely obtained two-dimensional (2D) images of a damaged vehicle part and estimated cost based on the 2D images without collecting depth information.

In an embodiment, a client device for using photo deformation techniques for vehicle repair analysis is provided. The client device includes a user interface, one or more image sensors, one or more processors communicatively coupled to the user interface and the one or more image sensors, and a non-transitory computer-readable memory coupled to the one or more processors and storing instructions thereon. When executed by the one or more processors, the instructions cause the client device to receive, via the user interface, vehicle identification information from a user for a vehicle involved in a vehicle crash, capture, via the one or more image sensors, one or more three-dimensional images each depicting a same damaged vehicle part from the vehicle, and analyze the one or more three-dimensional images to identify a plurality of damaged part characteristics for the damaged vehicle part. The instructions further cause the client device to transmit the vehicle identification information and the plurality of damaged part characteristics to a server device, wherein the server device compares the vehicle identification information and the plurality of damaged part characteristics to a set of training data to determine a repair time for repairing the damaged vehicle part. Additionally, the instructions cause the client device to receive, from the server device, the repair time for repairing the damaged vehicle part according to the comparison, and display an indication of the repair time on the user interface.

In another embodiment, a method for using photo deformation techniques for vehicle repair analysis is provided. The method includes receiving vehicle identification information from a user for a vehicle involved in a vehicle crash, capturing, via one or more image sensors, one or more three-dimensional images each depicting a same damaged vehicle part from the vehicle, and analyzing one or more three-dimensional images to identify a plurality of damaged part characteristics for the damaged vehicle part. The method further includes transmitting the vehicle identification information and the plurality of damaged part characteristics to a server device, wherein the server device compares the vehicle identification information and the plurality of damaged part characteristics to a set of training data to determine a repair time for repairing the damaged vehicle part. Additionally, the method includes receiving from the server device, the repair time for repairing the damaged vehicle part according to the comparison, and displaying an indication of the repair time on a user interface.

In yet another embodiment, a server device for using photo deformation techniques for vehicle repair analysis is provided. The server device includes one or more processors, and a non-transitory computer-readable memory coupled to the one or more processors and storing instructions thereon. When executed by the one or more processors, the instructions cause the server device to obtain a set of training data for damaged vehicle parts including actual repair times to repair the damaged vehicle parts, wherein the set of training data includes a plurality of subsets, each subset corresponding to a different actual repair time. For each subset, the instructions cause the server device to determine vehicle identification information and a plurality of previously damaged part characteristics for the previously damaged vehicle parts within the subset of the training data. When a vehicle part is damaged in a vehicle crash, the instructions cause the server device to receive, from a client device, vehicle identification information and currently damaged part characteristics for the currently damaged vehicle part, compare the vehicle identification information and the currently damaged part characteristics to the set of training data to determine a repair time for repairing the currently damaged vehicle part, and cause an indication of the repair time for repairing the currently damaged vehicle part to be displayed on a user interface of the client device.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 4A-E illustrate exemplary image capturing screens of a client application for capturing images at different positions and angles in accordance with the presently described embodiments;

DETAILED DESCRIPTION

Figure 1:
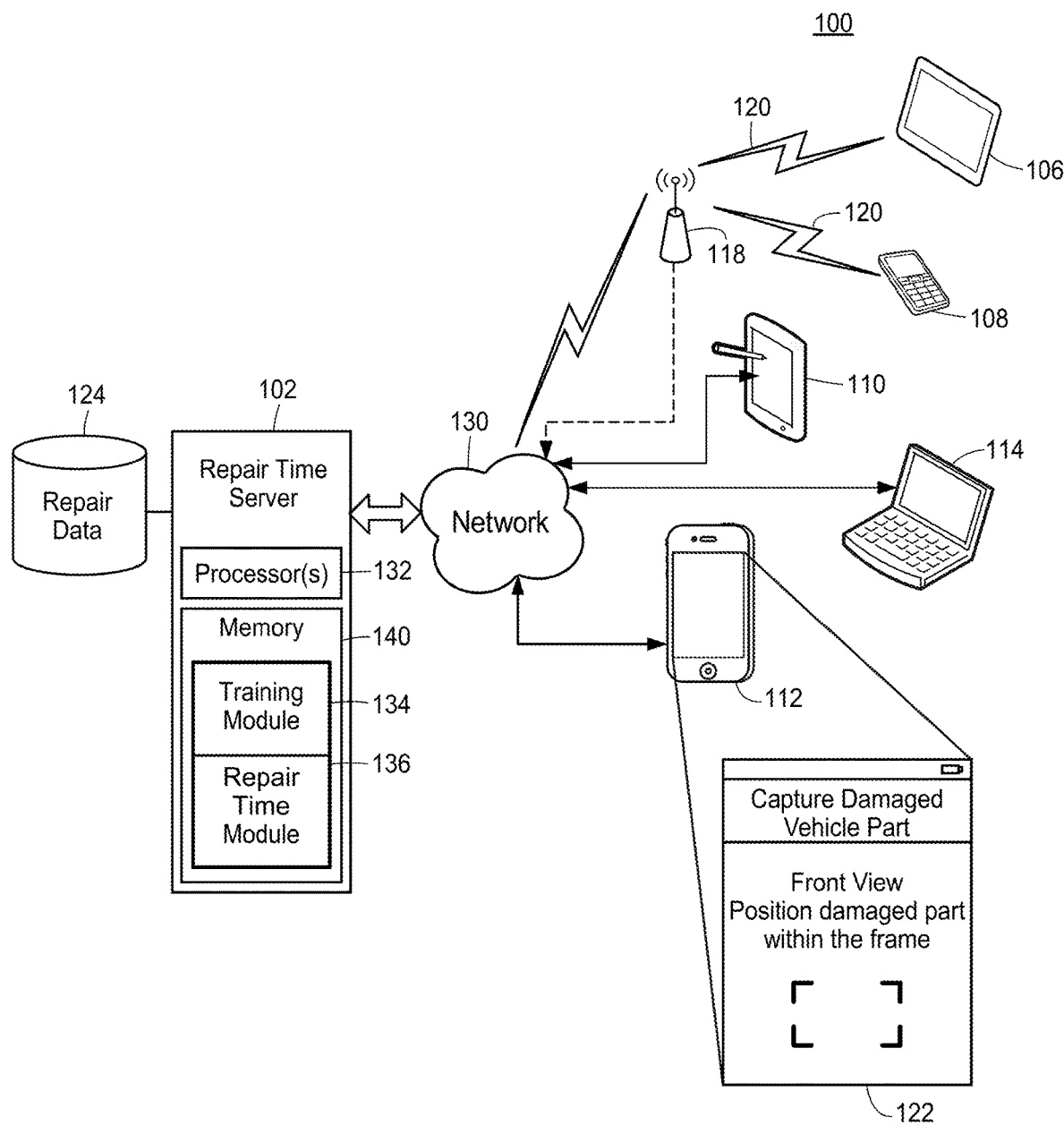
FIG. 1 illustrates a block diagram of a computer network and system on which an exemplary repair time system may operate in accordance with the presently described embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, as used herein, the term "vehicle" may refer to any of a number of motorized transportation devices. A vehicle may be a car, truck, bus, train, boat, plane, motorcycle, snowmobile, other personal transport devices, etc.

The term "three-dimensional (3D) image" or "3D model" as used herein may be used to refer to a group of pixels (which may be black and white, grayscale, red, green, blue (RGB) pixels, etc.) with 3D coordinates. For example, the 3D coordinates may be generated by a two-dimensional (2D) camera image captured from a known location within a 3D space. In another example, the position of each pixel within an image may be determined using a laser scanning device, and/or a combination of these.

The term "two-dimensional (2D) image" as used herein may be used to refer to an image rendered in a two-dimensional plane having a height and a width, such as an image captured via a digital camera.

Generally speaking, techniques for determining repair times may be implemented in one or several client devices, one or several network servers or a system that includes a combination of these devices. However, for clarity, the examples below focus primarily on an embodiment in which a repair time server obtains a set of training data and uses the training data to generate a statistical model for determining repair times for estimating and/or repairing a damaged vehicle part. The statistical model may be generated based on vehicle identification information and damaged part characteristics for the damaged vehicle part. Various machine learning techniques may be used to train the repair time server.

After the repair time server has been trained, a user may capture several images or video of a subsequently damaged vehicle part on the user's client device. The client device may generate a 3D model of the damaged vehicle part based on the images and identify damage part characteristics of the damaged vehicle part based on the 3D model, such as a dent circumference of a dent to the damaged vehicle part, a dent radius, a depth of the dent, a shape of the dent, etc. The client device may transmit the damaged part characteristics, vehicle identification information for the vehicle, and/or the type of damaged vehicle part to the repair time server. Accordingly, the repair time server may analyze the damaged part characteristics, vehicle identification information for the vehicle, and/or the type of damaged vehicle part using the machine learning techniques to determine a repair time and/or a confidence interval for repairing the damaged vehicle part. An indication of the repair time and/or confidence interval may be transmitted for display on the client device. If a damaged vehicle part is not repairable, the display will be capable of rendering a decision on repair vs. replacement of the damaged vehicle part.

Referring to FIG. 1, an example repair time system 100 includes a repair time server 102 and a plurality of client devices 106-114 which may be communicatively connected through a network 130, as described below. According to embodiments, the repair time server 102 may be a combination of hardware and software components, also as described in more detail below. The repair time server 102 may have an associated database 124 for storing data related to the operation of the repair time system 100 (e.g., training data including types of damaged vehicle parts, vehicle identification information for the damaged vehicle parts, damaged part characteristics for the damaged vehicle parts, actual repair times for repairing the damaged vehicle parts, etc.). Moreover, the repair time server 102 may include one or more processor(s) 132 such as a microprocessor coupled to a memory 140.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for a training module 134 and a repair time module 136. The repair time server 102 is described in more detail below with reference to FIG. 2A.

To generate a statistical model for determining repair times, a training module 134 may obtain a set of training data by receiving damaged vehicle part data indicative of previous vehicle repairs. The damaged vehicle part data may include the types of previously damaged vehicle parts, vehicle identification information for the previously damaged vehicle parts, previously damaged part characteristics for the previously damaged vehicle parts, and actual repair times for repairing the previously damaged vehicle parts. The training module 134 may then analyze the damaged vehicle part data to generate the statistical model.

In some embodiments, the training module 134 may generate a statistical model for each type of damaged vehicle part along with corresponding statistical models for differing vehicle types. For example, a first statistical model may be generated for determining repair times for hoods on a passenger car, a second statistical model may be generated for determining repair times for side doors on an SUV or light utility vehicle, a third statistical model may be generated for determining repair times for fenders on pickup trucks, etc. In any event, the set of training data may be analyzed using various machine learning techniques, such as linear regression, polynomial regression, logistic regression, random forests, boosting, nearest neighbors, neural networks, etc. In a testing phase, the training module 134 may compare test damaged part characteristics for a test damaged vehicle part to the statistical model to determine a repair time for repairing the test damaged vehicle part.

If the training module 134 makes the correct determination more frequently than a predetermined threshold amount, the statistical model may be provided to a repair time module 136. On the other hand, if the training module 134 does not make the correct determination more frequently than the predetermined threshold amount, the training module 134 may continue to obtain training data for further training.

The repair time module 136 may obtain the statistical model as well as vehicle identification information and currently damaged part characteristics for a currently damaged vehicle part (a damaged vehicle part which has not yet been repaired). For example, the repair time module 136 may receive the vehicle identification information and currently damaged part characteristics from one of the client devices 106-114. The vehicle identification information and currently damaged part characteristics for a currently damaged vehicle part may be compared to the statistical model to determine a repair time and/or a confidence interval for repairing the currently damaged vehicle part. The repair time may be represented as a number of hours and the confidence interval may be a range of time with a particular degree of confidence (e.g., 95 percent). In some embodiments, the repair time module 136 may determine likelihoods that the currently damaged vehicle part will be repaired within particular repair times based on the comparison to the statistical model. The repair time module 136 may then calculate a weighted average of the particular repair times according to the likelihoods and determine the repair time for repairing the currently damaged vehicle part based on the weighted average.

For example, using the statistical model the repair time module 136 may determine there is a 60 percent chance the currently damaged vehicle part will be repaired in four hours, a 30 percent chance the currently damaged vehicle part will be repaired in three hours, a five percent chance the currently damaged vehicle part will be repaired in 2.5 hours, and a five percent chance the currently damaged vehicle part will be repaired in 4.5 hours. In some embodiments, the repair time module 136 may rank the repair times according to the determined likelihoods, where repair times having higher likelihoods are ranked higher. In such embodiments, the repair time module 136 may calculate a weighted average of the repair times, where the weights are assigned in accordance with the likelihoods. For example, repair times with higher likelihoods may be weighted heavier than repair times with lower likelihoods.

Additionally, the repair time module 136 may filter out the repair times having likelihoods which are ranked below a threshold ranking. In the example above, the repair time module 136 may filter out the 2.5 and 4.5 hour repair times, because they have five percent likelihoods. The remaining repair times (e.g., the three hour and four hour repair times) may be combined by calculating a weighted average to determine the repair time for repairing the currently damaged vehicle.

In some embodiments, a market factor may be applied to the determined repair time. The market factor may be a multiplier to account for variation in different geographic locations. For example, the market factor in New York may be 2.5, and as a result, the determined repair time may be multiplied by 2.5 if the damaged vehicle is being repaired in New York. In another example, the market factor for Iowa may be 1.0. As a result, the determined repair time may be 2.5 times longer when the damaged vehicle is repaired in New York than when then damaged vehicle is repaired in Iowa. The repair time server 102 may obtain market factors for several different cities, states, etc., and the market factor may be identified for the geographic location where the damaged vehicle will be repaired.

The repair time module 136 may transmit an indication of the repair time to one of the client devices 106-114 for display on a user interface. The indication may include a numerical value for the repair time, a confidence interval, a cost estimate for repairing the vehicle based on the repair time and market rates for the user's location, etc.

The client devices 106-114 may include, by way of example, various types of "mobile devices," such as a tablet computer 106, a cell phone 108, a personal digital assistant (PDA) 110, a smart phone 112, a laptop computer 114, a portable media player (not shown), a home phone, a pager, a wearable computing device, smart glasses, smart watches or bracelets, phablets, other smart devices, devices configured for wired or wireless RF (Radio Frequency) communication, etc. Of course, any client device appropriately configured may interact with the repair time system 100. The client devices 106-114 need not necessarily communicate with the network 130 via a wired connection. In some instances, the client devices 106-114 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

Each of the client devices 106-114 may interact with the repair time server 102 to receive web pages and/or server data and may display the web pages and/or server data via a client application and/or an Internet browser (described below). For example, the smart phone 112 may display an image capture screen, may capture several images of the damaged vehicle part, and may interact with the repair time server 102. For example, when a user captures several images of the damaged vehicle part, a 3D model or damaged part characteristics identified using the 3D model may be transmitted to the repair time server 102.

The repair time server 102 may communicate with the client devices 106-114 via the network 130. The digital network 130 may be a proprietary network, a secure public Internet, a local area network (LAN), a wide area network (WAN), a virtual private network (VPN) or some other type of network, such as dedicated access lines, plain ordinary telephone lines, satellite links, combinations of these, etc. Where the digital network 130 comprises the Internet, data communication may take place over the digital network 130 via an Internet communication protocol.

Figure 2A:
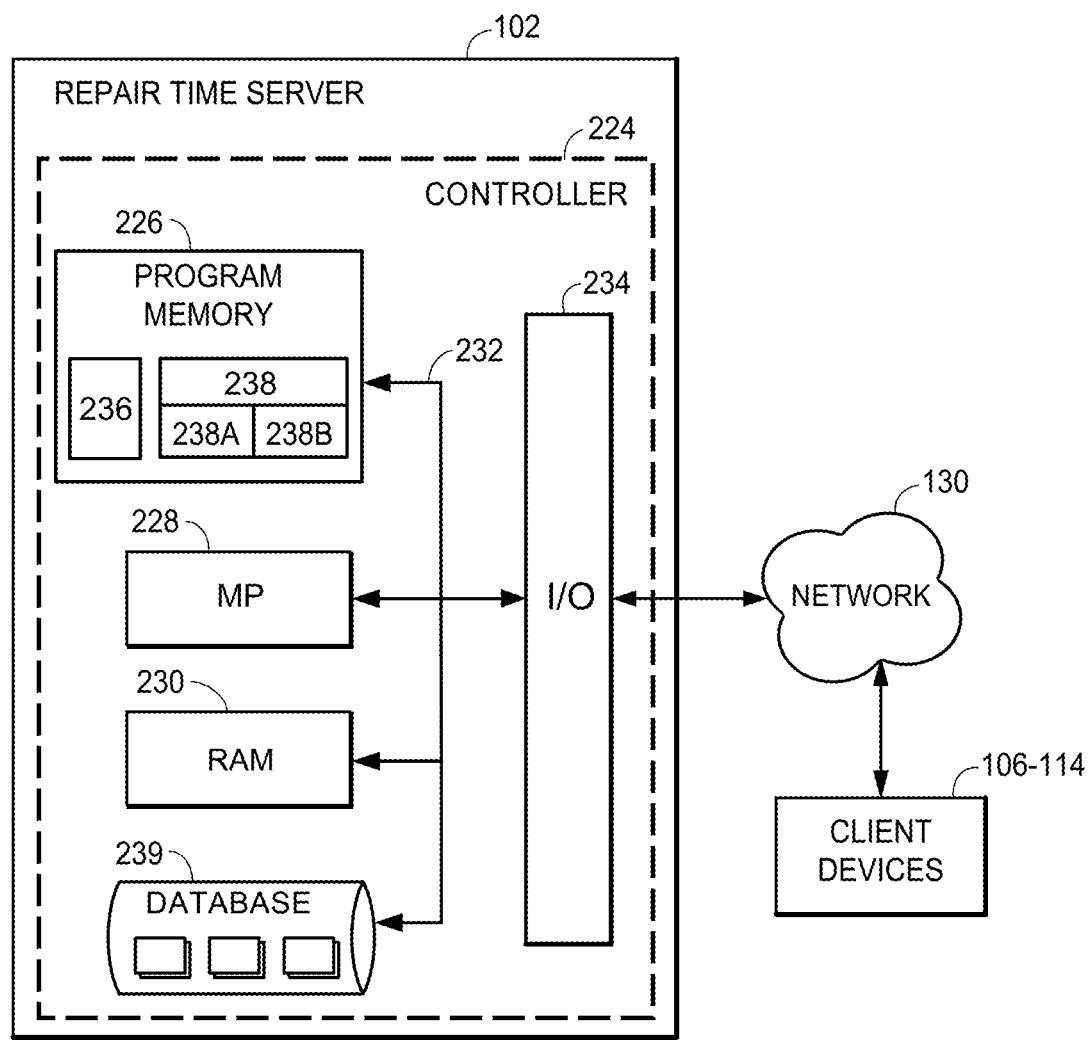
FIG. 2A illustrates a block diagram of an exemplary repair time server that can operate in the system of FIG. 1.

Turning now to FIG. 2A, the repair time server 102 may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as training data, web page templates and/or web pages, and other data necessary to interact with users through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the repair time server 102, which user interface may, for example, allow a system administrator to configure, troubleshoot, or test various aspects of the server's operation. A server application 238 may operate to receive damaged part data for a damaged vehicle part, determine a repair time for repairing the damaged vehicle part, and transmit an indication of the repair time to a user's client device 106-114. The server application 238 may be a single module 238 or a plurality of modules 238A, 238B such as the training module 134 and the repair time module 136.

While the server application 238 is depicted in FIG. 2A as including two modules, 238A and 238B, the server application 238 may include any number of modules accomplishing tasks related to implementation of the repair time server 102. Moreover, it will be appreciated that although only one repair time server 102 is depicted in FIG. 2A, multiple repair time server servers 102 may be provided for the purpose of distributing server load, serving different web pages, etc. These multiple repair time servers 102 may include a web server, an entity-specific server (e.g. an Apple® server, etc.), a server that is disposed in a retail or proprietary network, etc.

Figure 2B:
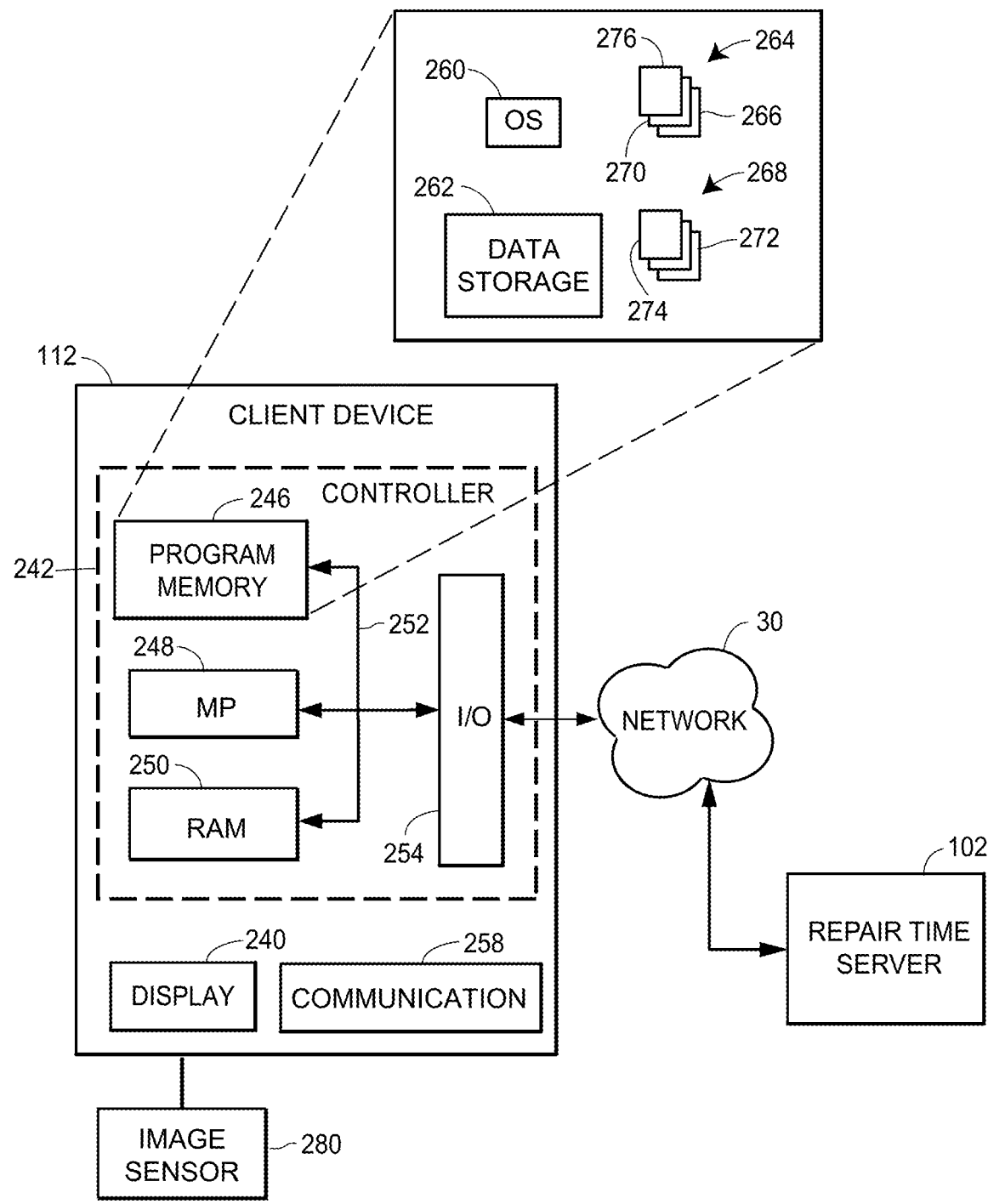
FIG. 2B illustrates a block diagram of an exemplary client device that can operate in the system of FIG. 1.

Referring now to FIG. 2B, the smart phone 112 (or any of the client devices 106-114) may include a display 240, a communication unit 258, a gyroscope (not shown) which measures change in roll, pitch, and yaw around the X-axis, Y-axis, and Z-axis of the smart phone 112, respectively, accelerometers (not shown), a positioning sensor such as a Global Positioning System (GPS) (not shown), a user-input device (not shown), and, like the repair time server 102, a controller 242. The client device 112 may also include an image sensor 280 which may be a camera and/or a laser scanning device for capturing 3D images including several points in a 3D point cloud based on red, green, blue-depth (RGB-D) sensor data from the laser scanning device and/or the camera. The laser scanning device may be a Light Detection and Ranging (LIDAR) sensor, or any other suitable laser scanning device. In some embodiments, the image sensor 280 may be removably attached to the exterior of the client device 112. In other embodiments, the image sensor 280 may be contained within the client device 112. Also in some embodiments, the camera may capture 2D images of an object (e.g., a damaged vehicle part), while the laser scanning device generates a beam which sweeps across the object to create the 3D point cloud. In other embodiments, the image sensor 180 includes a camera that captures several images of an object (e.g., a damaged vehicle part) at several positions and/or angles which are combined to generate a 3D model of the object.

Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the repair time server 102 through the digital network 130. In some embodiments, the controller 242 may also include, or otherwise be communicatively connected to, other data storage mechanisms (e.g., one or more hard disk drives, optical storage drives, solid state storage devices, etc.) that reside within the laptop computer 114.

The communication unit 258 may communicate with the repair time server 102 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the client device 112, an external hardware keyboard communicating via a wired or a wireless connection (e.g., a Bluetooth keyboard), an external mouse, or any other suitable user-input device.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the client device 112.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the server 102 while also receiving inputs from the user. Another application of the plurality of applications may include an embedded web browser 276 that may be implemented as a series of machine-readable instructions for receiving, interpreting, and/or displaying web page information from the repair time server 102. One of the plurality of routines may include an image capturing routine 272 which captures several images of an object for creating a 3D model of the object. Another routine in the plurality of routines may include a modeling routine 274 which creates a 3D model of the object from 2D images captured by the camera and/or depth information captured by the laser scanning device. In some embodiments, the modeling routine 274 may also identify damaged part characteristics from the 3D model and transmit the damaged part characteristics to the repair time server 102 for determining a repair time for repairing the damaged vehicle part.

Preferably, a user may launch the client application 266 from the client device 112, to communicate with the repair time server 102 to implement the repair time system. Additionally, the user may also launch or instantiate any other suitable user interface application (e.g., the native application or web browser 270, or any other one of the plurality of software applications 264) to access the repair time server 102 to realize the repair time system.

Figure 3:
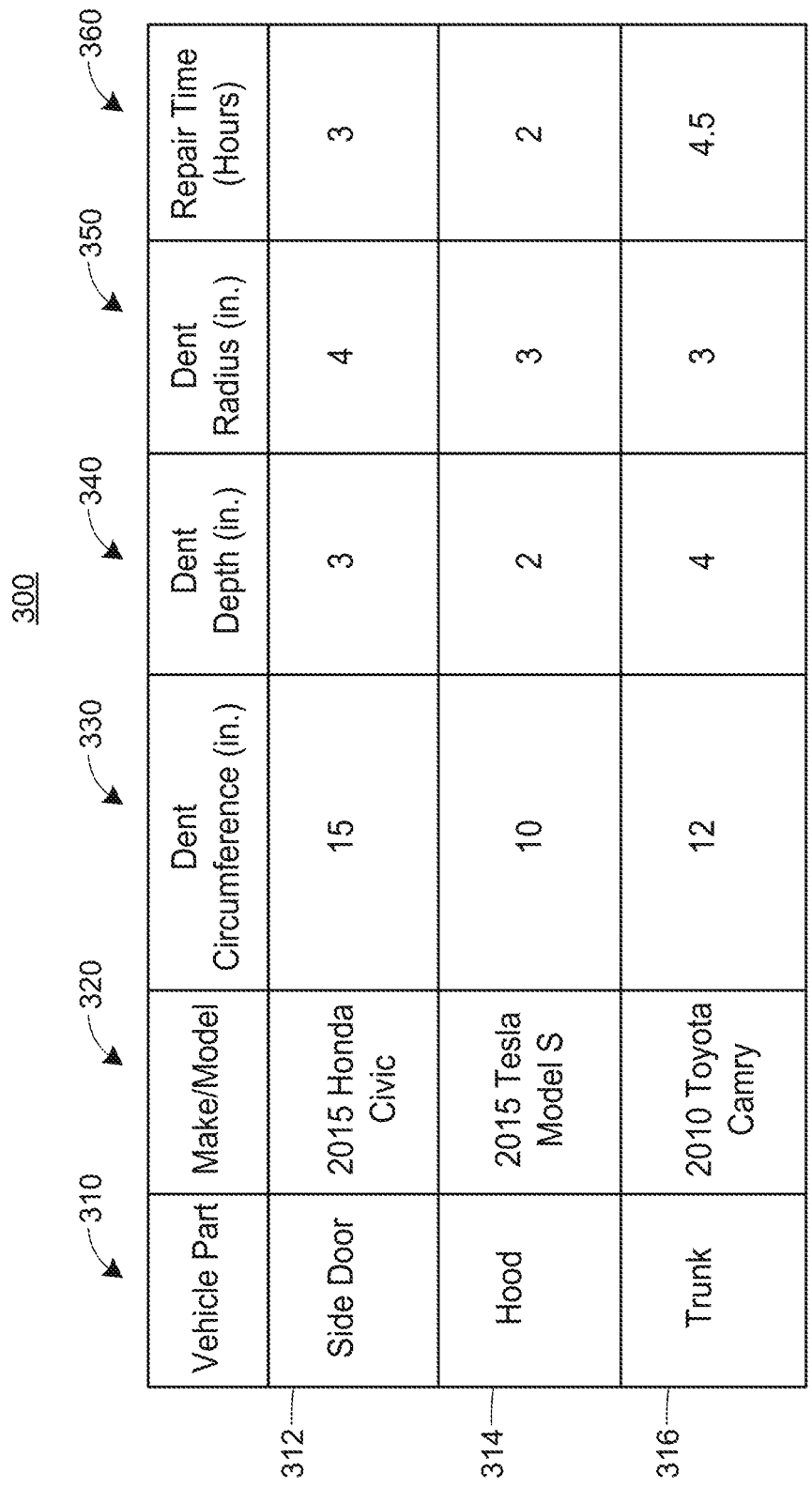
FIG. 3 illustrates exemplary training data including damaged vehicle part data for previously damaged vehicle parts and respective repair times which may be used for training a training module.

FIG. 3 depicts an exemplary log 300 of previously damaged part characteristics for previously damaged vehicle parts (damaged vehicle parts which have been repaired). The previously damaged part characteristics may be used as training data for the training module 134 as shown in FIG. 1, to generate a statistical model for determining repair times. The log 300 may include several entries of previously damaged part characteristics for previously damaged vehicle parts, where each entry includes the type of vehicle part 310, the make and model of the vehicle 320, a circumference of the dent to the vehicle part 330, the depth of the dent 340, the radius of the dent 350, and the amount of time it took for a repair service provider to repair the damaged vehicle part 360. Each of the entries in the log 300 may be indicative of actual vehicle repairs for previously damaged vehicle parts. For example, the actual amount of time for a repair service provider to repair a damaged vehicle part may be recorded along with characteristics of the damaged vehicle part, such as the type of vehicle part, the make and model of the vehicle, a circumference of the dent to the vehicle part, a depth of the dent, a radius of the dent, a shape of the dent, a part base material, etc.

In some embodiments, the training module 134 may separate the entries in the log 300 by vehicle part 310 and generate a separate statistical model for each type of vehicle part. For example, the training module 134 may generate a first statistical model for determining repair times for repairing hoods, a second statistical model for determining repair times for repairing trunks, a third statistical model for determining repair times for repairing side doors, etc. In other embodiments, the training module 134 may generate a single statistical model for determining a repair time for repairing a vehicle part.

In some embodiments, the training module 134 may classify each of the entries in the log 300 into one of several subsets of training data, where each subset corresponds to a different repair time (e.g., one hour) or range of repair times (e.g., 0.5-1.5 hours). For example, the first entry 312 having a repair time of three hours may be classified in a first subset of training data for a range of repair times from three to four hours, the second entry 314 having a repair time of two hours may be classified in a second subset of training data for a range of repair times from two to three hours, and the third entry 316 having a repair time of 4.5 hours may be classified in a third subset of training data for a range of repair times from four to five hours.

Once each entry is classified into one of the subsets, the training module 134 may analyze each of the subsets to generate a statistical model for determining a repair time. For example, when the machine learning technique is random forests, the training module 134 may collect several representative samples of each of the subsets of the training data. Using each representative sample, the training module 134 may generate a decision tree for determining a repair time. The training module 134 may then aggregate and/or combine each of the decision trees to generate the statistical model, by for example averaging the repair times determined at each individual tree, calculating a weighted average, taking a majority vote, etc. In some embodiments, the training module 134 may also generate decision trees when the machine learning technique is boosting.

Each decision tree may include several nodes, branches, and leaves, where each node of the decision tree represents a test on a damaged part characteristic (e.g., is dent depth greater than three inches (in.)?). Each branch represents the outcome of the test (e.g., the dent depth is greater than three in.). Moreover, each leaf represents a different repair time (e.g., two hours), confidence interval (e.g., 1.7-2.2 hours with 90 percent confidence), or likelihood based on the combined test outcomes for the branches which connect to the leaf.

For example, the training module 134 may generate a decision tree where a first node corresponds to whether the vehicle was made after 2001. If the vehicle was not made after 2001 a first branch may connect to a first leaf node which may indicate that the repair time will be between six and seven hours with 75 percent confidence. If the vehicle was made after 2001, a second branch may connect to a second node which corresponds to whether the whether the dent circumference is above 12 in.

If the dent circumference is above 12 in., a third branch may connect to a second leaf node which may indicate that the repair time will be between five and six hours with 85 percent confidence. However, if the dent circumference is not above 12 in., a fourth branch may connect to a third leaf node which may indicate that the repair time will be between 3.5 and 4.5 hours with 95 percent confidence. While the decision tree includes three leaf nodes and four branches, this is merely an example for ease of illustration only. Each decision tree may include any number of nodes, branches, and leaves, having any suitable number and/or types of tests on patient variables and/or statistical measures.

In any event, by combining and/or aggregating several decision trees as in random forests or boosting methods, the training module 134 may identify the damaged part characteristics which are the most important for determining a repair time. The most important damaged part characteristics are those that most frequently result in early splitting of the decision trees and most indicative of different repair times amongst the various subsets. Referring to the example decision tree above, the vehicle year may be more important than the dent circumference, because the dent circumference appears lower in the tree than the vehicle year. Therefore, in this example, vehicle year is the most important statistical measure.

By identifying the most important damaged part characteristics, the training module 134 may eliminate those damaged part characteristics which are the least important and may be misleading and/or random noise from the statistical model and when obtaining sets of training data in the future. In some embodiments, damaged part characteristics may be assigned weights according to their respective levels of importance. The training module 134 may then use the assigned weights when generating the statistical models. For example, vehicle year may be weighted heavier than dent circumference in the statistical model, such that the vehicle year may have a larger impact on repair time than the dent circumference. In another example, the part base material for the damaged vehicle part (e.g. aluminum, carbon fiber, steel, etc.) may have a larger impact on repair time than dent length, width, circumference, etc. In another example, a damaged part characteristic which is the least important may be weighted by a factor of 0 or almost 0 to filter out the damaged part characteristic from the statistical model.

In other embodiments, the machine learning technique used by the training module 134 may be a regression analysis, such as logistic regression, linear regression, polynomial regression, etc. For example, in a linear regression, the actual repair times may be dependent variables and each of the damaged part characteristics may be independent variables. Using the entries in the log 300, the training module 134 may generate a statistical model as an equation which most closely approximates the repair times 360 from the vehicle year, make, and model 320, dent circumference 330, dent depth 340, and dent radius 350. In some embodiments, an ordinary least squares method may be used to minimize the difference between the value of predicted repair times using the statistical model and the actual repair times 360 from the log 300. Additionally, the differences between the values of each predicted repair time ($\hat{y}_i$) using the statistical model and actual repair time ($y_i$) in the log 300 may be aggregated and/or combined in any suitable manner to determine a mean square error (MSE) of the regression. The MSE may then be used to determine a standard error or standard deviation ($\sigma_\varepsilon$) in the statistical model, which may in turn be used to create confidence intervals. For example, assuming the data in the log 300 is normally distributed, a confidence interval which includes about three standard deviations from the predicted repair time using the statistical model ($\hat{y}_i-3\sigma_\varepsilon-\hat{y}_i+3\sigma_\varepsilon$) may correspond to 99.5 percent confidence. A confidence interval which includes about two standard deviations from the predicted repair time using the statistical model ($\hat{y}_i-2\sigma_\varepsilon-\hat{y}_i+2\sigma_\varepsilon$) may correspond to 95 percent confidence. Moreover, a confidence interval which includes about 1.5 standard deviations from the predicted repair time using the statistical model ($\hat{y}_i-1.5\sigma_\varepsilon-\hat{y}_i+1.5\sigma_\varepsilon$) may correspond to 90 percent confidence.

In yet other embodiments, the damaged part characteristics may include visual descriptors which may be portions of images of the damaged vehicle part and their respective positions in relation to the damaged vehicle part. In some scenarios, each visual descriptor may include an image representing a portion of the damaged vehicle part having common attributes, such as a center portion of a damaged area, an outer portion of the damaged area, etc. In such an embodiment, the machine learning technique used by the training module 134 may be nearest neighbors.

In nearest neighbors, each previously damaged vehicle part in the training data may include one or several visual descriptors. Visual descriptors for a currently damaged vehicle part may be extracted based on images captured by the user and compared to the visual descriptors in the training data. In some embodiments, this may include a pixel by pixel comparison of RGB pixel values and the 3D coordinate positions of each pixel. The visual descriptors in the training data may be identified which are the most similar to the visual descriptors for the currently damaged vehicle part. As a result, the actual repair time for the previously damaged vehicle part corresponding to the identified visual descriptors in the training data may be determined as the repair time for the currently damaged vehicle part.

In any event, the training module 134 may then test the statistical model generated using random forests, boosting, linear regression, or any other suitable machine learning technique. For example, the training module 134 may obtain test data including test damaged part characteristics and a test repair time. While the test repair time is known (e.g., the test damaged part characteristics and test repair time are also from a previously damaged vehicle part similar to the training data but the test damaged part characteristics and test repair time are used for testing purposes), the training module 134 may determine the repair time or a confidence interval for the repair time by comparing the test damaged part characteristics to the statistical model.

For example, when the statistical model is a random forest, the training module 134 may traverse nodes from the aggregated and/or combined decision trees using the test damaged part characteristics. In particular, a node of the aggregated and/or combined decision trees may correspond to whether the dent circumference is above 14 in. The training module 134 may then follow a first branch of the node if the dent circumference in the test data is above 14 in, and a second branch of the node if the dent circumference is at or below 14 in. After traversing each of the nodes which correspond to the test damaged part characteristics for the test data, the training module 134 may reach a leaf which may indicate a repair time or a confidence interval for the repair time. The repair time determined by the training module 134 may then be compared to the test repair time. In some embodiments, if the repair time determined by the training module 134 is within a threshold amount (e.g., one hour) of the test repair time, the determination may be determined correct. In some embodiments, if the training module 134 calculates a confidence interval and the test repair time is within the confidence interval, the determination may be deemed correct. In other embodiments, the spread for the confidence interval must be within a predetermined threshold (e.g., within 2.5 hours) before the determination is deemed correct.

In any event, when the training module 134 is correct more than a predetermined threshold amount of the time, the statistical model may be presented to the repair time module 136. On the other hand, if the training module 134 is not correct more than the threshold amount, the training module 134 may continue obtaining sets of training data for previously damaged vehicle parts where the actual repair times are known for further training.

The repair time module 136 may then receive currently damaged part characteristics or a 3D model for a currently damaged vehicle part, where the repair time for repairing the vehicle part is unknown. Accordingly, the repair time module 136 may compare the currently damaged part characteristics for the currently damaged vehicle part to the statistical model generated by the training module 134 to determine a repair time. This is described in more detail below with reference to FIG. 5.

While the exemplary log 300 includes three entries, this is merely for ease of illustration only. There may be hundreds, thousands, millions, billions, and/or any other suitable number of entries in the repair time system 100. Moreover, the entries may include additional or alternative damaged part characteristics and/or may omit one or more of the damaged part characteristics included in the exemplary log 300. Accordingly, the training module 134 may generate the statistical model using any of the damaged part characteristics included in the log 300.

FIGS. 4A-F depict exemplary image capturing screens and an exemplary repair time display screen which may be generated by the repair time server 102 and displayed by the client application 266 of the client device 112. In other embodiments, the exemplary screens may be generated and displayed by the client device 112. As will be appreciated by those of ordinary skill in the relevant art(s), the exemplary image capturing screens and exemplary repair time display screen shown in FIGS. 4A-F are for illustrative purposes, and the associated functionality may be implemented using any suitable format and/or design for facilitating corresponding described functionalities without departing from the spirit and scope of the present disclosure. In some embodiments, the repair time server 102 may transmit web pages.

When a user is involved in a vehicle crash, the user may capture images or video of a damaged vehicle part via the client application 266 on the client device 112. The client application 266 may include several image capturing screens which direct the user to capture images or video of the damaged vehicle part at various positions and/or angles for generating a 3D model of the damaged vehicle part. In some embodiments, the client device 112 may include a camera which captures 2D images of the damaged vehicle part while a laser scanning device captures depth information for the damaged vehicle part to create a 3D point cloud using RGB-D sensor data. In other embodiments, the camera captures 2D images of the damaged vehicle part which are combined according to the respective positions from which the images or video were captured to generate the 3D point cloud.

FIG. 4A depicts an example image capturing screen 400 for a front view of the damaged vehicle part. The image capturing screen 400 may include a description of the view, "Front View" 402, from which the images should be captured. Additionally, a frame 404 is included for positioning the image of the damaged vehicle part. When the user positions the damaged vehicle part within the frame 404, the camera of the client device 112 may automatically capture one or several images of the damaged vehicle part. Additionally, the laser scanning device may capture depth information while the one or several images are captured, for example by generating a beam which sweeps across the damaged vehicle part. In other embodiments, the user may select a user control included on the image capturing screen 400 to capture one or several images of the damaged vehicle part when the damaged vehicle part is positioned within the frame 404.

The orientation of the frame brackets 404*a-d* in the image capturing screen 400 may be provided as a signal to the user of the position from which the images should be captured relative to the damaged vehicle part. For example, the frame brackets 404*a-d* are parallel to the bottom of the image capturing screen 400 for the front view indicating that the user should capture images of the damaged vehicle part from directly in front of the damaged vehicle part. In the other image capturing screens described in more detail below, the frame brackets may be presented at various angles with respect to the bottom of the image capturing screen for directing the user to position herself so that the images are captured from the proper angle. As the user moves while keeping the damaged vehicle part within the frame, the frame brackets may rotate until the frame brackets are parallel to the bottom of the image capturing screen. In some embodiments, the client device 112 may detect the user's movement via the GPS and/or the gyroscope. When the frame brackets are parallel to the bottom, the camera of the client device 112 may automatically capture one or several images of the damaged vehicle part.

For example, FIG. 4B depicts another example image capturing screen 410 for an angled view of the damaged vehicle part from the right. In this image capturing screen 410, the user is instructed to capture one or several images of the damaged vehicle part from the right at an angle with respect to the front of the damaged vehicle part. As in the image capturing screen of FIG. 4A, the image capturing screen 410 includes a description of the view, "Right Angle View," 412, and instructions to rotate the camera or client device 112 until the frame 414 is properly aligned.

The frame brackets 414*a-d* are presented at an angle with respect to the bottom of the image capturing screen 410. As the user rotates counterclockwise to the right about the damaged vehicle part, the frame brackets 414*a-d* may rotate oppositely, to the left. When the user has rotated the correct amount to the right about the damaged vehicle part, the frame brackets 414*a-d* may be presented parallel to the bottom of the image capturing screen 410, which may be a signal to the user to capture images of the damaged vehicle part, when the damaged vehicle part is within the frame 414.

FIG. 4C depicts yet another example image capturing screen 420 for an angled view of the damaged vehicle part from left, similar to the image capturing screen 410 as shown in FIG. 4B. In this image capturing screen 420, the user is instructed to capture one or several images of the damaged vehicle part from the left at an angle with respect to the front of the damaged vehicle part. As in the image capturing screen of FIG. 4A, the image capturing screen 420 includes a description of the view, "Left Angle View," 422, and instructions to rotate the camera or client device 112 until the frame 424 is properly aligned.

The frame brackets 424*a-d* are presented at an angle with respect to the bottom of the image capturing screen 420. As the user rotates clockwise to the left about the damaged vehicle part, the frame brackets 424*a-d* may rotate oppositely, to the right. When the user has rotated the correct amount to the left about the damaged vehicle part, the frame brackets 424*a-d* may be presented parallel to the bottom of the image capturing screen 420, which may be a signal to the user to capture images of the damaged vehicle part, when the damaged vehicle part is within the frame 424.

FIG. 4D depicts another example image capturing screen 430 for a left side view of the damaged vehicle part. In this image capturing screen 430, the user is instructed to capture one or several images of the damaged vehicle part from the left side of the damaged vehicle part. As in the image capturing screen of FIG. 4A, the image capturing screen 430 includes a description of the view, "Left Side View," 432, and instructions to rotate the camera or client device 112 until the frame 434 is properly aligned.

The frame brackets 434*a-d* are presented perpendicular with respect to the bottom of the image capturing screen 430. As the user rotates clockwise to the left about the damaged vehicle part, the frame brackets 434*a-d* may rotate oppositely, to the right. When the user has rotated the correct amount to the left about the damaged vehicle part (in this case so that the user is at about a 90 degree angle with respect to the front of the damaged vehicle part), the frame brackets 434*a-d* may be presented parallel to the bottom of the image capturing screen 430, which may be a signal to the user to capture images of the damaged vehicle part, when the damaged vehicle part is within the frame 434.

Figure 4F:
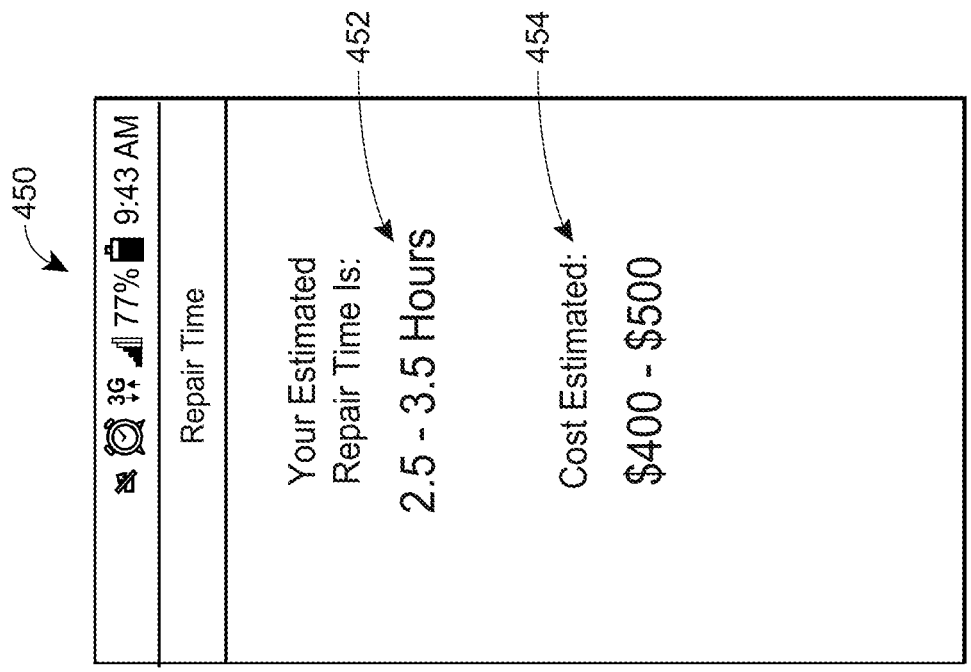
FIG. 4F illustrates an exemplary repair time display screen of the client application in accordance with the presently described embodiments.
Figure 4E:
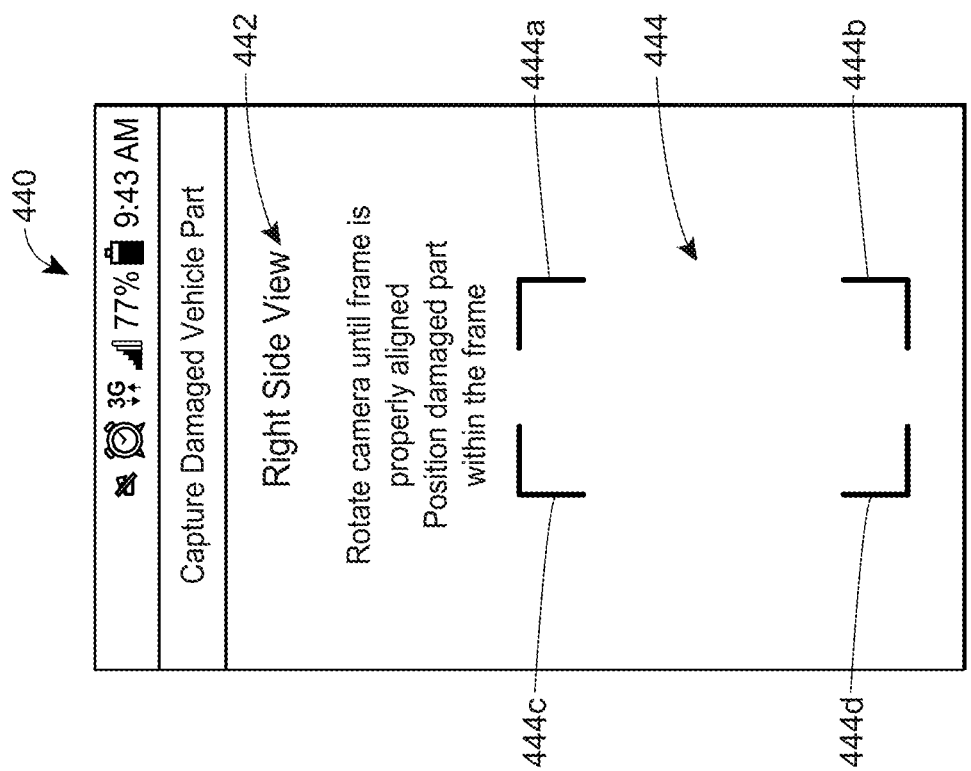

FIG. 4E depicts yet another example image capturing screen 440 for a right side view of the damaged vehicle part. In this image capturing screen 440, the user is instructed to capture one or several images of the damaged vehicle part from the right side of the damaged vehicle part. As in the image capturing screen of FIG. 4A, the image capturing screen 440 includes a description of the view, "Right Side View," 442, and instructions to rotate the camera or client device 112 until the frame 444 is properly aligned.

The frame brackets 444*a-d* are presented perpendicular with respect to the bottom of the image capturing screen 440. As the user rotates counterclockwise to the right about the damaged vehicle part, the frame brackets 444*a-d* may rotate oppositely, to the left. When the user has rotated the correct amount to the right about the damaged vehicle part (in this case so that the user is at about a 90 degree angle with respect to the front of the damaged vehicle part), the frame brackets 444*a-d* may be presented parallel to the bottom of the image capturing screen 440, which may be a signal to the user to capture images of the damaged vehicle part, when the damaged vehicle part is within the frame 444.

While FIGS. 4A-4E depict five example image capturing screens 410-440 for capturing images of the damaged vehicle part from a front view, a right angle view, a left angle view, a left side view, and a right side view, respectively, this is merely an exemplary embodiment for ease of illustration only. Any number of image capturing screens may direct the user to capture images at any number of positions and/or angles with respect to the damaged vehicle part. For example, additional or alternative image capturing screens may direct the user to capture images from a rear view, a 45 degree view from the right, a 30 degree view from the left, etc. In other embodiments, the image capturing screens 410-440 may not direct the user to capture images from several positions and/or angles, and instead the user may capture several images of the damaged vehicle part from the front view. The laser scanning device may then capture depth information while the several images are being captured.

In any event, the one or several images captured in FIGS. 4A-4E may be combined to generate a 3D model of the damaged vehicle part. More specifically, each of the images may be captured from various locations as indicated by the GPS in the client device 112, for example. Additionally, each image frame may have a particular scale (e.g., each pixel represents an inch, six inches, a foot, etc.) based on the distance between the client device 112 and the damaged vehicle part. According to the position at which the image was captured from and the scale of the image, the client device 112 may determine the positions of each pixel within the image. When two or more images depict a common position, the images may be combined using the overlapping position. This may be repeated for each of the images to generate the 3D model. In some embodiments, the laser scanning device may capture depth information while the several images are being captured. The 3D model may be generated based on a combination of the depth information and combining images which depict common positions. The 3D model may then be transmitted to the repair time server 102 to identify damaged part characteristics within the 3D model of the damaged vehicle part, or the client device 112 may identify the damaged vehicle characteristics.

In addition to capturing images for generating the 3D model, the client application 266 may also include a screen with user controls for the user to enter in vehicle identification information for the vehicle, such as a Vehicle Identification Number (VIN), a year, make and model of the vehicle, a part base material (e.g., aluminum, carbon fiber, steel), etc. The user controls may also allow the user to enter in the type of damaged vehicle part, such as hood, trunk, fender, side door, etc. This information may also be transmitted to the repair time server 102 or used by the client device 112 to identify damaged vehicle characteristics and/or to determine the appropriate statistical model for comparison.

In an exemplary scenario, John Doe damages the hood of his 2010 Ford Taurus in a crash with another vehicle. Before taking his car to a repair service provider, John takes several pictures of the hood with his smart phone at various positions or angles (e.g., from directly in front of the hood, from the left and right sides of the hood, at a 45 degree angle with respect to the hood, etc.) as directed by the client application. The client application then generates a 3D model or image of the hood by combining the images and/or utilizing depth information from a laser scanning device attached to John's smart phone. The 3D model or damaged vehicle characteristics derived from the 3D model may be transmitted to a server device. As a result, the server device may compare the damaged vehicle characteristics for a damaged area within the hood to a statistical model for determining repair times using one of the machine learning techniques described above. John's smart phone may then receive and display the repair time and/or a confidence interval determined by the server device. In this manner, John Doe is made aware of the amount of time it should take to repair the hood (or that the hood may require replacement) and/or the cost of repair almost immediately after the crash.

Figure 5:
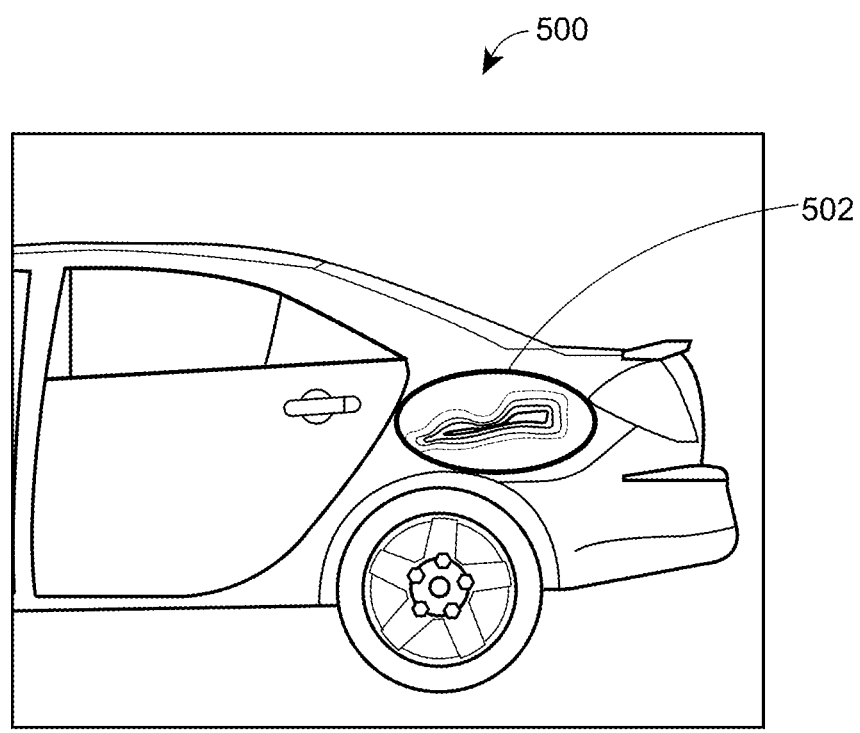
FIG. 5 illustrates an exemplary 3D model of a damaged vehicle part in accordance with the presently described embodiments.

An example 3D model 500 of the damaged vehicle part may be depicted in FIG. 5. While the example 3D model 500 appears to be a 2D image, this is for ease of illustration only. Each pixel in the 3D model 500 may include a set of 3D coordinates indicative of the pixel's location within the image. The 3D coordinates may be used to determine physical distances between pixels within the image, which may then be used for determining damaged part characteristics (e.g., a dent depth).

The client device 112 or the repair time server 102 may identify damaged areas (e.g., dents, cracked or broken windows, scratches, etc.) within the damaged vehicle part using the 3D model. To identify the damaged areas, the client device 112 or the repair time server 102 may segment boundaries for the damaged areas using edge detection, pixel entropy, or other image processing techniques. The client device 112 or the repair time server 102 may then identify characteristics of the damaged areas such as a dent shape, a dent area, a dent circumference, a dent radius, a dent depth, etc., which may be used as currently damaged part characteristics for comparison to the statistical model to determine a repair time.

To segment boundaries for a damaged area, the client device 112 or the repair time server 102 may filter color from the 3D model 500 converting it to grayscale to further accentuate the boundaries of damaged areas in the 3D model 500. The client device 112 or the repair time server 102 may then perform edge detection techniques to segment boundaries for the damaged areas. For example, when adjacent pixels in the 3D model 500 differ in intensity by more than a threshold amount, the client device 112 or the repair time server 102 may identify the intersection between the adjacent pixels as a boundary of a damaged area. In another example, when a cluster of pixels in the 3D model 500 differs in intensity by more than a threshold amount from an adjacent cluster of pixels, the client device 112 or repair time server 102 may identify the intersection between the adjacent pixels as a boundary of a damaged area. In addition to performing the edge detection techniques described above to identify the boundaries of a damaged area, the client device or the repair time server 102 may use an active contour model to refine the locations of the boundaries and further remove noise.

In any event, the boundary segmentation may identify a dent 502 having a set of boundaries which form an elliptical shape. The client device 112 or repair time server 102 may then obtain each of the 3D coordinates for the pixels included within the boundaries of the dent 502. Then the client device 112 or the repair time server 102 may determine the shape of the dent 502 based on the 3D coordinates for the pixels around the boundaries. The client device 112 or the repair time server 102 may also determine the circumference and area of the dent 502 based on the 3D coordinates for the pixels around the boundaries. Furthermore, the client device 112 or the repair time server 102 may determine the depth of the dent 502. The depth of the dent 502 may be determined by for example, identifying the pixel within the boundaries having the least amount depth according to its 3D coordinates and the pixel within the boundaries having the most amount of depth according to its 3D coordinates and calculating the difference. The client device 112 or the repair time server 102 may determine the radius of the dent 502 by identifying a center point and calculating the distance from the center point to the boundaries.

The client device or repair time server 112 may further identify any other suitable damaged part characteristics within the boundaries of the dent 502. For example, visual descriptors for the dent 502 may be identified. Each visual descriptor may be a subset of the pixels within the boundaries of the dent 502 and their respective 3D coordinates. In some embodiments, the visual descriptor may include a subset of the pixels having common attributes, such as a center portion of the dent 502, an outer portion 502 of the dent, etc. The visual descriptors may be identified using edge detection techniques, similar to the edge detection techniques mentioned above.

While the client device 112 or the repair time server 102 identifies a dent 502 via the boundary segmentation as shown in FIG. 5, this is merely one example of a damaged area within a damaged vehicle part for ease of illustration only. The client device 112 or the repair time server 102 may identify several damaged areas and determine damaged part characteristics for each of the damaged areas. Moreover, the client device 112 or the repair time server 102 may identify broken or cracked windows, scratches, etc.

In any event, each set of currently damaged part characteristics for a damaged area may be obtained by the repair time module 136 as shown in FIG. 1. The repair time module 136 may identify the statistical model for determining the repair time. For example, if the training module 134 generates several statistical models where each statistical model is for a different vehicle part or its base material (e.g., a first statistical model for determining repair times for repairing hoods made of aluminum, a second statistical model for determining repair times for repairing hoods made of carbon fiber, a third statistical model for determining repair times for repairing trunks made of aluminum, a fourth statistical model for determining repair times for repairing trunks made of carbon fiber, a fifth statistical model for determining repair times for repairing side doors, etc.), the repair time module 136 may obtain the type of vehicle part in the set of damaged part characteristics and identify the corresponding statistical model.

Then, the repair time module 136 may compare the currently damaged part characteristics to the identified statistical model to determine the repair time and/or a confidence interval for repairing the currently damaged vehicle part. For example, when the statistical model is a random forest, the repair time module 136 may evaluate each node of the random forest according to the currently damaged part characteristics for the currently damaged vehicle part until reaching a leaf node. When a leaf node is reached, the repair time module 136 may determine the repair time as the repair time included in the leaf node. In another example, when the statistical model is a regression, the repair time module 136 may apply the currently damaged part characteristics to the equation for the statistical model generated as a result of the regression analysis. A standard error may also be determined from the statistical model and the standard error in combination with the results of the equation may be used to determine a confidence interval for the repair time (e.g., 1-3 hours with 95 percent confidence).

In yet another example, when the statistical model is generated using nearest neighbors, visual descriptors for the currently damaged vehicle part may be compared to visual descriptors in the training data. The visual descriptors in the training data may be identified which are the most similar to the visual descriptors for the currently damaged vehicle part. As a result, the actual repair time for the identified visual descriptors in the training data may be determined as the repair time for the currently damaged vehicle part.

When a vehicle includes several damaged vehicle parts and/or a damaged vehicle part includes several damaged areas (e.g., dents), the repair time module 136 may determine a repair time for each damaged vehicle part and/or damaged area. The individual repair times may be aggregated and/or combined in any suitable manner to determine a total repair time. For example, each individual repair time may be added together. In another example, a repair service provider may take longer to perform the first repair on a vehicle than subsequent repairs (e.g., the repair service provider may gather the equipment for all of the individual repairs before making the first repair). Accordingly, the repair times may be weighted and then combined to determine the total repair time.

The determined repair time for a currently damaged vehicle part may then be transmitted to the client device 112 for display via the client application 266. FIG. 4F depicts an example repair time display screen 450 including an indication of the repair time 452 for the currently damaged vehicle part. The indication of the repair time 452 may be a number of hours for the repair (e.g., three hours), may be an interval (e.g., 2.5-3.5 hours), may include a level of confidence (e.g., 80 percent), and/or may include a cost estimate 454 (e.g., $400-$500) based on the repair time and a market rate for performing the repair. The market rate may be determined based on the user's location. For example, the cost per hour may be greater in New York City than in Raleigh. Additionally, the cost estimate may be based on an average parts cost associated with repairing the damaged vehicle part. The average parts cost may be based on the age of the damaged vehicle part, the make and model of the damaged vehicle part, etc.

As a result, the user may receive a repair time which is more accurate and has less variation than the estimates that the user may receive from repair service providers. In some embodiments, an insurance provider may also receive the repair time for the currently damaged vehicle part on the insurance provider's client device 112. Accordingly, the insurance provider may cause the user to get another estimate if the user's repair service provider estimates that it will take longer than the repair time displayed on the client device 112 to repair the vehicle.

When the damaged vehicle part is repaired and the actual repair time is measured, the damaged part characteristics for the damaged vehicle part may be added to the training data set, and the statistical model may be updated accordingly.

Figure 6:
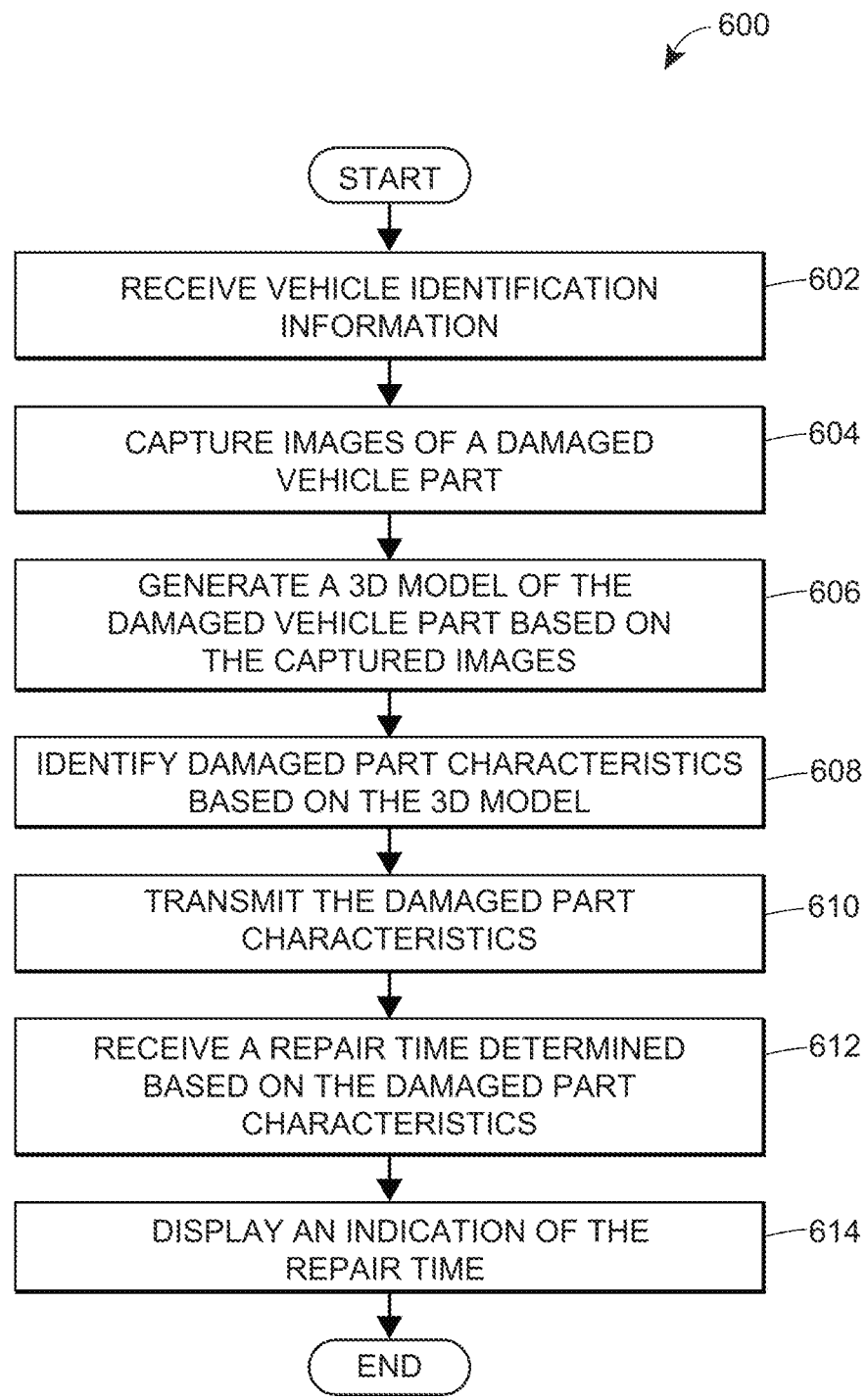
FIG. 6 illustrates a flow diagram representing an exemplary method for using photo deformation techniques for vehicle repair analysis in accordance with the presently described embodiments.

FIG. 6 depicts a flow diagram representing an exemplary method 600 for using photo deformation techniques for vehicle repair analysis. The method 600 may be executed on the client device 112. In some embodiments, the method 600 may be implemented in a set of instructions stored on a non-transitory computer-readable memory and executable on one or more processors of the client device 112. For example, the method 600 may be performed by the client application 266. In other embodiments, the method 600 may be performed by the repair time server 102 and/or a combination of the client device and the repair time server 102.

At block 602, the client device 112 and more specifically, the client application 266 may receive vehicle indication information for a vehicle damaged in a crash. The vehicle identification information may include a VIN number, a make, model, and year of the vehicle, a license plate number, etc. In some embodiments, the client application 266 may display a vehicle information screen with a user control for entering in the vehicle identification information, such as a text field, a drop-down menu, etc. Also in some embodiments, the vehicle information screen may include another user control for entering in the type of vehicle part damaged in the crash, such as a hood, trunk, fender, side door, etc. When multiple vehicle parts are damaged, the user may be able to enter in the type for each damaged vehicle part.

For each damaged vehicle part, the client application 266 may display one or several image capturing screens, such as the image capturing screens 400-440 as shown in FIGS. 4A-4E, for capturing images of the damaged vehicle part (block 604). The user may select a user control on each image capturing screen for capturing an image via a camera in the client device 112. In other embodiments, the images may be captured automatically when the damaged vehicle part is aligned within the frame of the image capturing screen. While the images are captured, a laser scanning device which may be removably attached to the client device 112 may capture depth information for the damaged vehicle part by generating a beam which sweeps across the damaged vehicle part.

Each image capturing screen may direct the user to capture one or more images of the damaged vehicle part from a different position and/or angle. For example, a first image capturing screen may direct the user to capture a front view of the damaged vehicle part from directly in front of the damaged vehicle part. A second image capturing screen may direct the user to capture a left side view of the damaged vehicle part from the left side of the damaged vehicle part. A third image capturing screen may direct the user to capture a rear view of the damaged vehicle part from directly behind the damaged vehicle part, etc.

The captured images may then be combined to generate a 3D image or 3D model of the damaged vehicle part (block 606). For example, the depth information from the laser scanning device may be combined with pixel information from the captured images to generate RGB-D sensor data and/or a 3D point cloud. In another example, each pixel in an image may correspond to a physical location as determined by the GPS for example. When two or more images depict common positions, the images may be combined using the overlapping positions to generate the 3D image or 3D model of the damaged vehicle part.

At block 608, the client device 112 may identify one or several currently damaged part characteristics within a damaged area of the currently damaged vehicle part based on the 3D model. The currently damaged part characteristics may include a dent shape, a dent circumference, a dent radius, a dent area, a dent depth, a part base material, etc. When the damaged area is a scratch, the currently damaged part characteristics may include a scratch length, a scratch area, etc.

The currently damaged part characteristics, vehicle identification information, and type of the currently damaged vehicle part may be transmitted to a server device, such as the repair time server 102 (block 610). The repair time server 102 may then obtain a statistical model for determining a repair time for repairing the currently damaged vehicle part. Moreover, the repair time server 102 may compare the vehicle identification and/or currently damaged part characteristics to the statistical model to determine a repair time and/or a confidence interval for repairing the currently damaged vehicle part. The repair time and/or confidence interval may then be transmitted to the client device (block 612), and an indication of the repair time may be displayed via the client application (block 614). The indication of the repair time may include a number of hours for repairing the currently damaged vehicle part. In another example, the indication of the repair time may include a range of times in which the currently damaged vehicle part is likely to be repaired in with a confidence level. In yet another example, the indication may include a cost estimate for repairing the currently damaged vehicle part based on the repair time and a market rate for performing vehicle repairs. The market rate may be an hourly rate.

When several vehicle parts are damaged in a vehicle crash, the client device 112 may display indications of repair times for repairing each damaged vehicle part separately, or may combine the individual repair times to generate a total repair time for repairing the vehicle. In some embodiments, the individual repair times may be weighted and combined to generate the total repair time.

Figure 7:
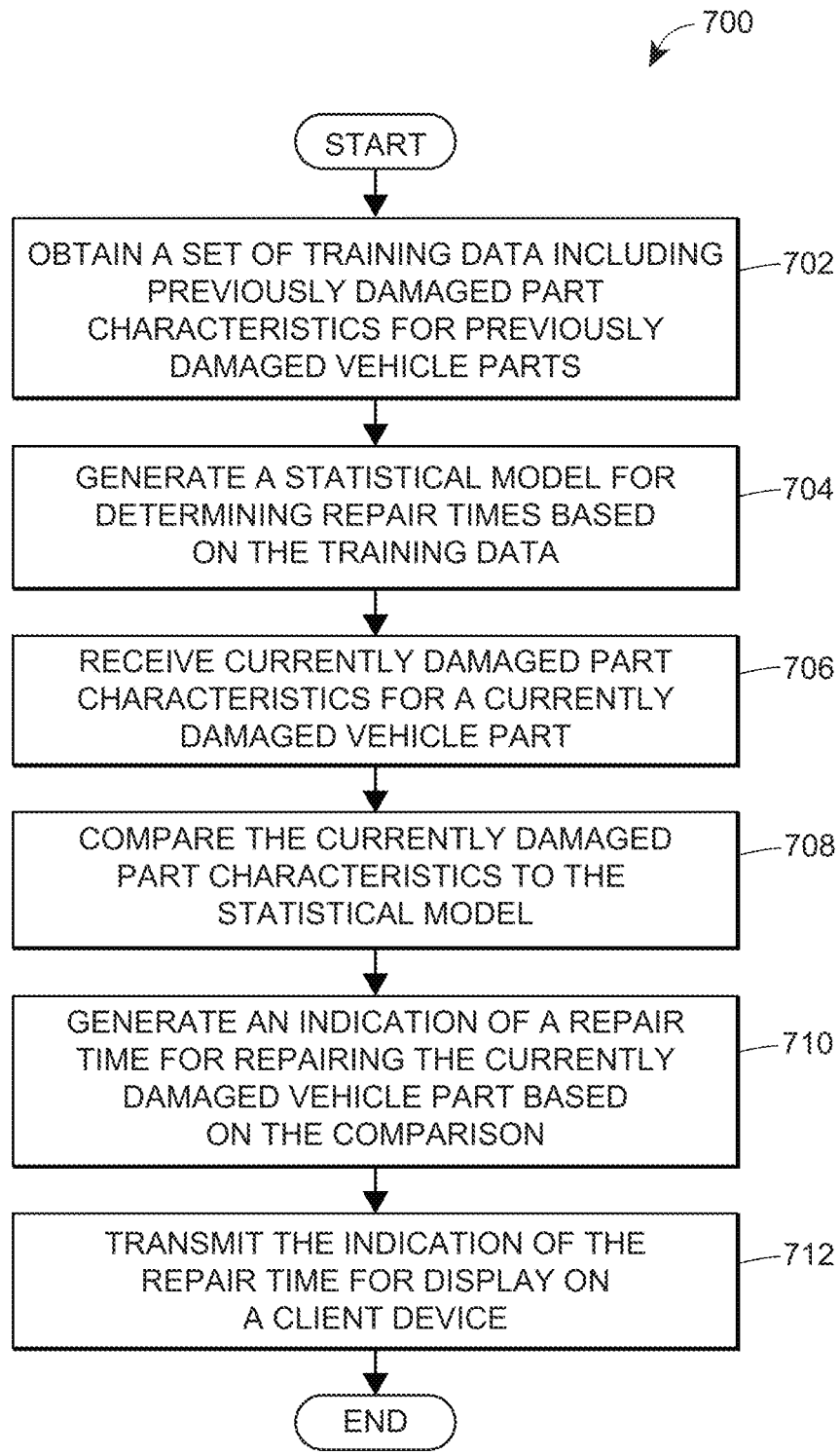
FIG. 7 illustrates a flow diagram representing an exemplary method for generating a statistical model using damaged vehicle part data for previously damaged vehicle parts to determine repair times in accordance with the presently described embodiments.

FIG. 7 depicts a flow diagram representing an exemplary method 700 for generating a statistical model using damaged vehicle part data for previously damaged vehicle parts to determine repair times. The method 700 may be executed on the repair time server 102. In some embodiments, the method 700 may be implemented in a set of instructions stored on a non-transitory computer-readable memory and executable on one or more processors of the repair time server 102. For example, the method 700 may be performed by the training module 134 and the repair time module 136 of FIG. 1.

At block 702, the repair time server 102 may obtain a set of training data including previously damaged part characteristics for previously damaged vehicle parts. Each of the previously damaged vehicle parts may correspond to an actual repair time, which is the actual amount of time a repair service provider took to repair the previously damaged vehicle part. The previously damaged part characteristics may include the type of the vehicle part, the part base material (e.g., aluminum, carbon fiber, steel, etc.), the make and model of the vehicle, a circumference of a damaged area in the vehicle part, a depth of the damaged area, a radius of the damaged area, a shape of the damaged area, an area of the damaged area, visual descriptors for the damaged area or a portion of the damaged area, etc.

The training module 134 may then analyze the training data to generate a statistical model for determining repair times for currently damaged vehicle parts (block 704). In some embodiments, the training module 134 may generate a separate statistical model for each type of vehicle part. For example, the training module 134 may generate a first statistical model for determining repair times for repairing vehicle hoods, a second statistical model for determining repair times for repairing vehicle trunks, a third statistical model for determining repair times for repairing side doors, etc.

In some embodiments, the training module 134 may classify each of the previously damaged part characteristics into one of several subsets of training data, where each subset corresponds to a different repair time (e.g., one hour) or range of repair times (e.g., 0.5-1.5 hours). In other embodiments, the training module 134 may generate an equation which most closely approximates the actual repair times from a combination of the previously damaged part characteristics.

In any event, the statistical model may be generated by analyzing the training data using various machine learning techniques, such as linear regression, polynomial regression, logistic regression, random forests, boosting, nearest neighbors, neural networks, or any other suitable machine learning technique.

At block 706, the repair time module 136 may receive currently damaged part characteristics for a currently damaged part from a user's client device 112, for example. The repair time module 136 may then identify a statistical model for determining the repair time based on the type of vehicle part for the currently damaged vehicle part. Then the repair time module 136 may compare the currently damaged part characteristics to the identified statistical model (block 708). For example, when the statistical model is a random forest, the repair time module 136 may evaluate each node of the random forest according to the currently damaged part characteristics for the currently damaged vehicle part until reaching a leaf node. When a leaf node is reached, the repair time module 136 may determine the repair time as the actual repair time included in the leaf node. In another example, when the statistical model is a regression, the repair time module 136 may apply the currently damaged part characteristics to the equation for the statistical model generated as a result of the regression analysis. A standard error may also be determined from the statistical model and the standard error in combination with the results of the equation may be used to determine a confidence interval for the repair time (e.g., 1-3 hours with 95 percent confidence).

As a result, the repair time module 136 may generate an indication of the repair time (block 710), which may include a number of hours for the repair (e.g., three hours), may be an interval (e.g., 2.5-3.5 hours), may include a level of confidence (e.g., 80 percent), and/or may include a cost estimate (e.g., $400-$500) based on the repair time and a market rate for performing the repair. The indication may be transmitted to the client device 112 for display via the client application 266, for example (block 712). In one example, the client device 112 may display the indication of the repair time on the repair time display screen 450 as shown in FIG. 4F.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

I claim:

1. A server device for using photo deformation techniques for vehicle repair analysis, the server device comprising:
   one or more processors;
   a non-transitory computer-readable memory coupled to the one or more processors, and storing thereon instructions that, when executed by the one or more processors, cause the server device to:
      obtain a set of training data for previously damaged vehicle parts including actual repair times to repair the previously damaged vehicle parts, wherein the set of training data includes a plurality of subsets, each subset corresponding to a different actual repair time;
      for each subset, determine vehicle identification information and a plurality of previously damaged part characteristics for the previously damaged vehicle parts within the subset of the training data;
      when a vehicle part is damaged in a vehicle crash, receive, from a client device, vehicle identification information and currently damaged part characteristics for the currently damaged vehicle part, including:
         receiving three-dimensional image data depicting the currently damaged vehicle part; and
         analyzing the three-dimensional image data to identify the currently damaged part characteristics for the currently damaged vehicle part, including identifying a depth of a dent to the currently damaged vehicle part based on a difference in depth values within a portion of the three-dimensional image data corresponding to the dent;
      compare the vehicle identification information and the currently damaged part characteristics to the set of training data to determine a repair time for repairing the currently damaged vehicle part; and
      cause an indication of the repair time for repairing the currently damaged vehicle part to be displayed on a user interface of the client device.

2. The server device of claim 1, wherein the instructions further cause the server device to generate a statistical model for determining repair times for currently damaged vehicle parts according to currently damaged part characteristics based on the actual repair times, vehicle identification information, and previously damaged part characteristics for each subset in the training data.

3. The server device of claim 1, wherein an indication of the repair time includes a numerical value indicative of the repair time and a cost estimate for repairing the damaged vehicle part based on the repair time and an estimated rate for performing the repair.

4. The server device of claim 3, wherein the numerical value indicative of the repair time includes a confidence interval.

5. The server device of claim 1, wherein to compare the vehicle identification information and currently damaged part characteristics to the set of training data to determine a repair time for repairing the currently damaged vehicle part, the instructions cause the server device to:
   compare the vehicle identification information and the currently damaged part characteristics to the set of training data to identify likelihoods that the vehicle identification information and currently damaged part characteristics match with a plurality of subsets of the training data;
   rank the plurality of subsets of the training data according to the likelihoods that the vehicle identification information and the currently damaged part characteristics match; and
   combine the actual repair times associated with one or more of the plurality of subsets of the training data ranked above a threshold ranking to determine the repair time for repairing the currently damaged vehicle part.

6. The server device of claim 5, wherein to combine the actual repair times associated with one or more of the plurality of subsets of the training data, the instructions cause the server device to calculate a weighted average of the actual repair times associated with the one or more subsets of the training data, wherein subsets ranked higher receive heavier weights.

7. A client device for using photo deformation techniques for vehicle repair analysis, the client device comprising:
   a user interface;
   one or more image sensors;
   one or more processors communicatively coupled to the user interface and the one or more image sensors;
   a non-transitory computer-readable memory coupled to the one or more processors, and storing thereon instructions that, when executed by the one or more processors, cause the client device to:

receive, via the user interface, vehicle identification information from a user for a vehicle involved in a vehicle crash;

capture, via the one or more image sensors, three-dimensional image data each depicting a same damaged vehicle part from the vehicle;

generate a three-dimensional model of the damaged vehicle part based on the three-dimensional image data;

analyze the three-dimensional model to identify a plurality of damaged part characteristics for the damaged vehicle part, including identifying a depth of a dent to the damaged vehicle part based on a difference in depth values within a portion of the three-dimensional model corresponding to the dent;

transmit the vehicle identification information and the plurality of damaged part characteristics to a server device, wherein the server device compares the vehicle identification information and the plurality of damaged part characteristics to a set of training data to determine a repair time for repairing the damaged vehicle part;

receive, from the server device, the repair time for repairing the damaged vehicle part according to the comparison; and display an indication of the repair time on the user interface.

8. The client device of claim 7, wherein the one or more image sensors includes a laser scanning device removably attached to the client device.

9. The client device of claim 7, wherein to capture the three-dimensional image data, the instructions cause the client device to capture a plurality of two-dimensional images each depicting the same damaged vehicle part at a plurality of positions and angles from the damaged vehicle part.

10. The client device of claim 7, wherein the damaged part characteristics further include at least one of: a type of the damaged vehicle part, a dent circumference of the dent to the damaged vehicle part, a dent radius, or a shape of the dent.

11. The client device of claim 7, wherein the server device compares the vehicle identification information and the plurality of damaged part characteristics to a set of training data having a plurality of subsets of the training data each including vehicle identification information, damaged part characteristics, and an actual repair time for repairing a vehicle having the vehicle identification and damaged part characteristics, and when there is match, the server device identifies the actual repair time for the matching subset as the repair time for repairing the damaged vehicle part.

12. The client device of claim 7, wherein an indication of the repair time includes a numerical value indicative of the repair time and a cost estimate for repairing the damaged vehicle part based on the repair time and an estimated rate for performing the repair.

13. The client device of claim 7, wherein to capture the three-dimensional image data each depicting a same damaged vehicle part from the vehicle, the instructions cause the client device to:

display an image capture screen instructing the user to capture an image of the damaged vehicle part within a set of boundaries displayed on the image capture screen;

capture, via the one or more image sensors, an image of the damaged vehicle part within the set of boundaries;

display a plurality of additional image capture screens instructing the user to capture a plurality of additional images of the damaged vehicle part within a plurality of additional sets of boundaries, wherein each additional set of boundaries is at a different orientation relative to the damaged vehicle part;

capture, via the one or more image sensors, the plurality of additional images of the damaged vehicle part within the plurality of additional sets of boundaries; and combine the captured image and plurality of additional images to generate the three-dimensional model.

14. A method for using photo deformation techniques for vehicle repair analysis, the method executed by one or more processors programmed to perform the method, the method comprising:

receiving, at one or more processors in a client device, vehicle identification information from a user for a vehicle involved in a vehicle crash;

capturing, by the one or more processors via one or more image sensors communicatively coupled to the one or more processors, three-dimensional image data depicting a same damaged vehicle part from the vehicle;

generating, by the one or more processors, a three-dimensional model of the damaged vehicle part based on the three-dimensional image data analyzing, by the one or more processors, the three-dimensional image data to identify a plurality of damaged part characteristics for the damaged vehicle part, including identifying a depth of a dent to the damaged vehicle part based on a difference in depth values within a portion of the three-dimensional model corresponding to the dent;

transmitting, by the one or more processors, the vehicle identification information and the plurality of damaged part characteristics to a server device, wherein the server device compares the vehicle identification information and the plurality of damaged part characteristics to a set of training data to determine a repair time for repairing the damaged vehicle part;

receiving, at the one or more processors from the server device, the repair time for repairing the damaged vehicle part according to the comparison; and displaying, by the one or more processors, an indication of the repair time on a user interface.

15. The method of claim 14, wherein the one or more image sensors includes a laser scanning device removably attached to the client device.

16. The method of claim 14, wherein capturing the three-dimensional image data includes capturing, via the one or more image sensors, a plurality of two-dimensional images each depicting the same damaged vehicle part at a plurality of positions and angles from the damaged vehicle part.

17. The method of claim 14, wherein the damaged part characteristics further include at least one of: a type of the damaged vehicle part, a dent circumference of the dent to the damaged vehicle part, a dent radius, or a shape of the dent.

18. The method of claim 14, wherein the server device compares the vehicle identification information and the plurality of damaged part characteristics to a set of training data having a plurality of subsets of the training data each including vehicle identification information, damaged part characteristics, and an actual repair time for repairing a vehicle having the vehicle identification and damaged part characteristics, and when there is match, the server device identifies the actual repair time for the matching subset as the repair time for repairing the damaged vehicle part.

19. The method of claim 14, wherein an indication of the repair time includes a numerical value indicative of the repair time and a cost estimate for repairing the damaged vehicle part based on the repair time and an estimated rate for performing the repair.

20. The method of claim 14, wherein capturing the three-dimensional image data each depicting a same damaged vehicle part from the vehicle includes:
- displaying, by the one or more processors, an image capture screen instructing the user to capture an image of the damaged vehicle part within a set of boundaries displayed on the image capture screen;
- capturing, by the one or more processors via the one or more image sensors, an image of the damaged vehicle part within the set of boundaries;
- displaying, by the one or more processors, a plurality of additional image capture screens instructing the user to capture a plurality of additional images of the damaged vehicle part within a plurality of additional sets of boundaries, wherein each additional set of boundaries is at a different orientation relative to the damaged vehicle part;
- capturing, by the one or more processors via the one or more image sensors, the plurality of additional images of the damaged vehicle part within the plurality of additional sets of boundaries; and
- combining, by the one or more processors, the captured image and the plurality of additional images to generate the three-dimensional model.

\* \* \* \* \*